US010632898B2

(12) United States Patent
Chingyo et al.

(10) Patent No.: US 10,632,898 B2
(45) Date of Patent: Apr. 28, 2020

(54) ILLUMINATION DEVICE AND MOVING BODY

(71) Applicant: PANASONIC INTELLECTUAL PROPERTY MANAGEMENT CO., LTD., Osaka (JP)

(72) Inventors: Yohei Chingyo, Osaka (JP); Tomoyuki Nakano, Osaka (JP); Masaru Fujita, Osaka (JP); Kenichiro Mase, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/361,918

(22) Filed: Mar. 22, 2019

(65) Prior Publication Data
US 2019/0299846 A1 Oct. 3, 2019

(30) Foreign Application Priority Data

Mar. 29, 2018 (JP) ................. 2018-066202

(51) Int. Cl.
*B60Q 1/08* (2006.01)
*F21S 41/24* (2018.01)
(Continued)

(52) U.S. Cl.
CPC .............. *B60Q 1/08* (2013.01); *B60Q 1/0011* (2013.01); *F21S 41/24* (2018.01);
(Continued)

(58) Field of Classification Search
CPC ......... B60Q 1/08; B60Q 1/0011; F21S 41/24; F21S 41/141
See application file for complete search history.

(56) References Cited

U.S. PATENT DOCUMENTS 5,931,576 A * 8/1999 Kreysar .................. F21V 9/00
362/552
6,361,180 B1 * 3/2002 Iimura .............. G02F 1/133615
362/551
(Continued)

FOREIGN PATENT DOCUMENTS

JP  2006-318922  11/2006
JP  2013-110068  6/2013
(Continued)

*Primary Examiner* — Anne M Hines
(74) *Attorney, Agent, or Firm* — Greenblum & Bernstein, P.L.C.

(57) ABSTRACT

An illumination device disposed on a moving body includes at least one main light source, and at least one auxiliary light source disposed in a periphery of the at least one main light source when seen along a traveling direction of the moving body. The illumination device further includes a first light guide disposed adjacent to the at least one main light source, that guides light transmitted from the at least one main light source, and a second light guide that is disposed adjacent to the at least one auxiliary light source, that guides light transmitted from the at least one auxiliary light source. The illumination device also includes an optical component that transmits the light from the first light guide and the light from the second light guide in the traveling direction of the moving body.

12 Claims, 9 Drawing Sheets

(51) Int. Cl.
*B60Q 1/00* (2006.01)
*F21S 41/141* (2018.01)
(52) U.S. Cl.
CPC .. *B60Q 2300/054* (2013.01); *B60Q 2300/056* (2013.01); *B60Q 2300/42* (2013.01); *F21S 41/141* (2018.01)

(56) References Cited

U.S. PATENT DOCUMENTS

| | | | | |
|---|---|---|---|---|
| 6,471,383 | B1* | 10/2002 | Oyama | F21S 41/17 362/517 |
| 2010/0103694 | A1* | 4/2010 | Saxena | G02B 6/0001 362/554 |
| 2013/0135885 | A1 | 5/2013 | Anzai | |
| 2013/0188380 | A1 | 7/2013 | Sekiguchi | |
| 2016/0281951 | A1 | 9/2016 | Nakazato et al. | |
| 2016/0341386 | A1 | 11/2016 | Iha et al. | |
| 2017/0009951 | A1 | 1/2017 | Lin et al. | |

FOREIGN PATENT DOCUMENTS

| | | |
|---|---|---|
| JP | 2013-152855 | 8/2013 |
| JP | 2014-086306 | 5/2014 |
| JP | 2014-127329 | 7/2014 |
| JP | 2015-185533 | 10/2015 |
| JP | 2016-181351 | 10/2016 |
| JP | 2016-212962 | 12/2016 |
| JP | 2017-016990 | 1/2017 |
| JP | 2017-208208 | 11/2017 |
| JP | 2017-224475 | 12/2017 |
| JP | 2017-228401 | 12/2017 |
| WO | 2015/107678 | 7/2015 |

* cited by examiner

ILLUMINATION DEVICE AND MOVING BODY

CROSS REFERENCE TO RELATED APPLICATION

This application claims the benefit of priority of Japanese Patent Application Number 2018-066202 filed on Mar. 29, 2018, the entire content of which is hereby incorporated by reference.

BACKGROUND

1. Technical Field

The present disclosure relates to an illumination device disposed on a moving body that illuminates a traveling direction of the moving body, and the moving body including the illumination device.

2. Description of the Related Art

Light fixtures mounted with daytime running lamps (DRLs) for indicating the presence of a vehicle frontward thereof during the day are conventionally known for lamps (illumination devices), such as headlamps for vehicles, besides low beams for illuminating an area frontward of the vehicle during nighttime.

For example, in Patent Literature (PTL) 1 (Japanese Unexamined Patent Application Publication No. 2017-208208), a lamp with an adjustable light distribution for daytime lighting that can be scaled down in size is disclosed.

SUMMARY

For example, low beams sometimes cause glare on drivers of oncoming vehicles when switching to low beams at the time the DRLs included in a lighting fixture are turned on.

The present disclosure provides the illumination device and the like for limiting glare.

An illumination device disposed on a moving body according to an aspect of the present disclosure that radiates light in a traveling direction of the moving body includes at least one main light source, and at least one auxiliary light source disposed in a periphery of the at least one main light source along a traveling direction of the moving body. The illumination device further includes a first light guide disposed adjacent to the at least one main light source that guides light transmitted from the at least one main light source, and a second light guide that is disposed adjacent to the at least one auxiliary light source that guides light transmitted from the at least one auxiliary light source. The illumination device also includes an optical component that transmits the light from the first light guide and the light from the second light guide in the traveling direction of the moving body. The illumination device also includes a processor configured to switch between (i) a first mode in which the at least one main light source is caused to emit light with a greater light intensity than the at least one auxiliary light source, and (ii) a second mode in which the at least one auxiliary light source is caused to emit light with a greater light intensity than the at least one main light source.

A moving body according to an aspect of the present disclosure includes the above illumination device as a headlamp.

The illumination device and the like according to an aspect of the present disclosure limit glare.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 7C is a diagram showing a light distribution pattern when the main light source of the illumination device according to the embodiment is turned on;

FIG. 8C is a diagram showing a light distribution pattern when the auxiliary light sources of the illumination device according to the embodiment are turned on;

DETAILED DESCRIPTION OF THE EMBODIMENT

Figure 1:
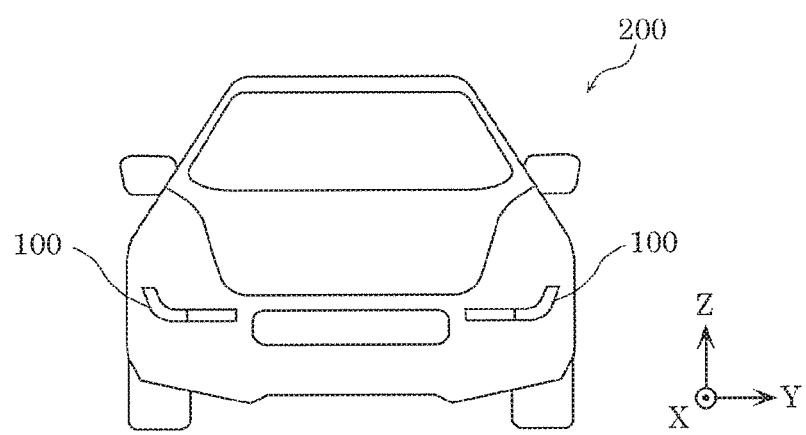
FIG. 1 is a diagram showing a moving body including illumination devices disposed on a moving body according to an embodiment.

Hereinafter, an embodiment in the present disclosure will be described with reference to the drawings. Note that the following embodiment shows a comprehensive or specific example. Numerical values, shapes, materials, components, placement and connection of the components, and the like in the following embodiment are mere examples and do not to limit the present disclosure. Moreover, components in the following embodiments not mentioned in any of the independent claims that define the broadest concepts are described as optional components.

Note that the following drawings are schematic diagrams and do not necessarily provide strictly accurate illustrations. Moreover, in each drawing, components that are substantially the same as components described previous thereto have the same reference numerals and overlapping descriptions may be omitted or simplified.

Moreover, in the present specification, "frontward of" is the direction in which light from an illumination device disposed on a moving body is emitted (light-emitting direction), and the direction in which light is produced (i.e., illumination direction). "Frontward of" is also the traveling direction when a vehicle equipped with the illumination device is moving forward.

Moreover, in the present specification, the Z-axis is, for example, the vertical axis, and the negative Z-Axis is also noted as "downward (lower side)". The positive X-axis is also noted as "frontward of". The Y-axis and the X-axis are orthogonal to each other in a plane perpendicular to the Z-axis (horizontal plane). The Y-axis is also noted as "horizontal".

Moreover, in the present specification, expressions such as "horizontal" are also used. In this case, "horizontal" means not only perfectly horizontal, but also includes a margin error of several percent occurring during manufacture or placement.

Embodiment (Configuration of Illumination Device)

A configuration of the illumination device according to the embodiment will be described first with reference to FIGS. 1 to 6.

The illumination device according to the embodiment is disposed near the traveling direction of the moving body to radiate light in the traveling direction of the moving body, and radiates light in the traveling direction of the moving body. The illumination device is used, for example, in moving bodies, such as automobiles, motorcycles or bicycles.

FIG. 1 is a diagram showing moving body 200 including illumination devices 100 according to the embodiment.

Moving body 200 includes illumination devices 100 as headlamps. In the present embodiment, moving body 200 includes two illumination devices 100 at a front thereof (positive side of X-axis) which is the traveling direction. In the present embodiment, moving body 200 is an automobile.

Figure 2:
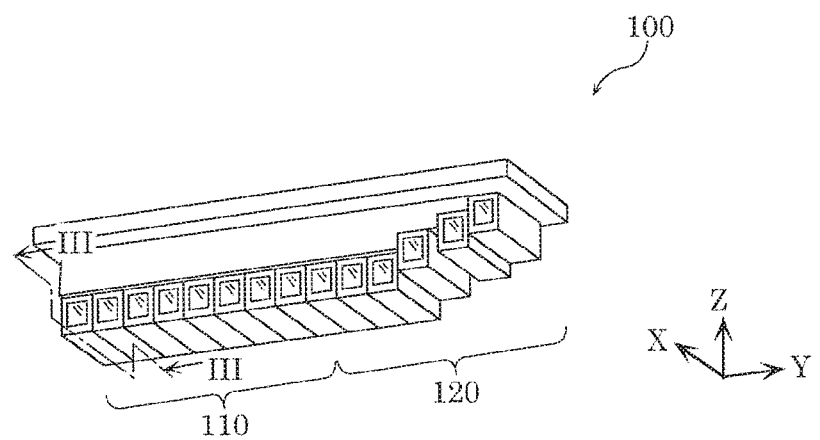
FIG. 2 is a perspective view showing the illumination device according to the embodiment.

FIG. 2 is a perspective view showing illumination device 100 according to the embodiment. Note that FIG. 2 shows illumination device 100 on the positive side of the Y-axis out of the two illumination devices 100 included in moving body 200 shown in FIG. 1. Illumination device 100 on the negative side of the Y-axis, out of the two illumination devices 100 included in moving body 200 shown in FIG. 1, has, for example, a structure in which each component of illumination device 100 shown in FIG. 2 is mirrored with respect to the XZ-plane.

Illumination device 100 includes at least one first light emitter 110 and at least one second light emitter 120. In the present embodiment, illumination device 100 includes seven first light emitters 110 and seven second light emitters 120.

First light emitter 110 and second light emitter 120 emit white light frontward of moving body 200.

Figure 3:
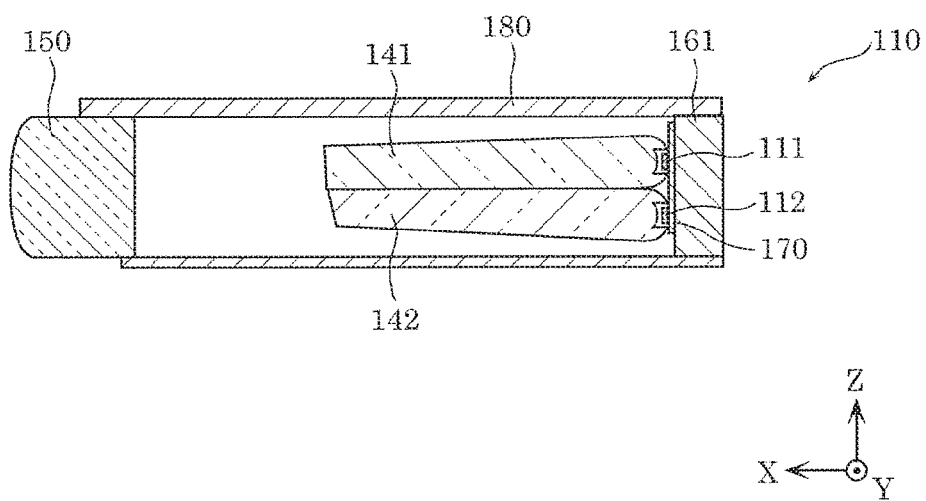
FIG. 3 is a cross-sectional view showing a cross section of the illumination device according to the embodiment along line III-III in FIG. 2.
Figure 4:
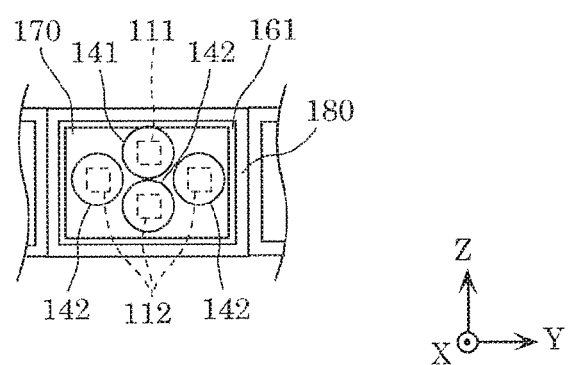
FIG. 4 is a diagram for describing a placement of a main light source and auxiliary light sources included in the illumination device according to the embodiment.
Figure 5:
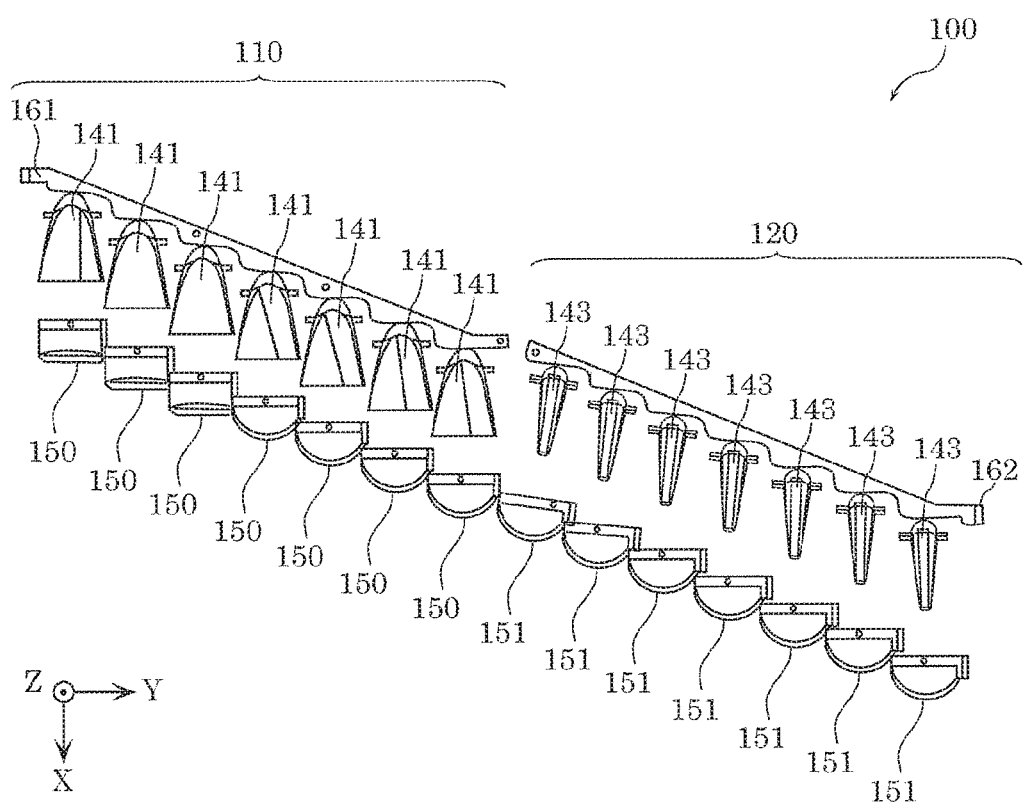
FIG. 5 is a top view showing light guides and optical components included in the illumination device according to the embodiment.
Figure 6:
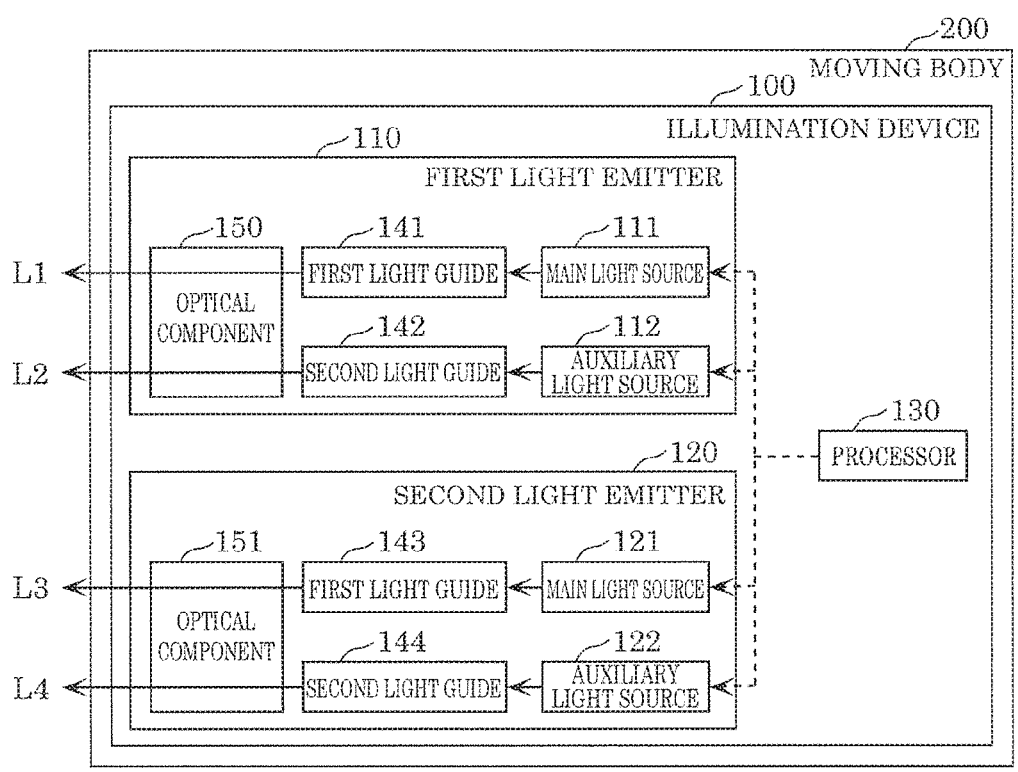
FIG. 6 is a block diagram showing a characteristic functional configuration of the illumination device according to the embodiment.

FIG. 3 is a cross-sectional view showing a cross section of illumination device 100 according to the embodiment along line III-III in FIG. 2. FIG. 4 is a diagram for describing a placement of main light source 111 and auxiliary light sources 112 included in illumination device 100 according to the embodiment. FIG. 5 is a top view showing first light guides 141 and 143, and optical components 150 and 151 included in illumination device 100 according to the embodiment. FIG. 6 is a block diagram showing a characteristic functional configuration of illumination device 100 according to the embodiment.

Note that FIGS. 3 and 4 show first light emitter 110, but second light emitter 120 has, for example, the same structure as first light emitter 110. Moreover, FIG. 4 is a diagram for describing the placement of first light guide 141, second light guides 142, main light source 111, and auxiliary light sources 112 as seen along the traveling direction of moving body 200, and illustration of optical component 150 is omitted.

Moreover, FIG. 5 shows the top view of first light guides 141 and 143 corresponding to main light sources 111 and 121, each of which are included in first light emitters 110 and second light emitters 120, and illustration of casings 180, second light guides 142 and 144 corresponding to auxiliary light sources 112 and 122, each of which are included in first light emitters 110 and second light emitters 120, and the like is omitted. FIG. 5 shows illumination device 100 on the positive side of the Y-axis out of the two illumination devices 100 included in moving body 200 shown in FIG. 1. Illumination device 100 on the negative side of the Y-axis, out of the two illumination devices 100 included in moving body 200 shown in FIG. 1, has, for example, a structure in which each component of illumination device 100 shown in FIG. 5 is mirrored with respect to the XZ-plane.

As illustrated in FIG. 2, illumination device 100 includes a plurality of light emitters made up of at least one first light emitter 110 and at least one second light emitter 120. The plurality of light emitters included in illumination device 100 are arranged horizontally (X-axis in the present embodiment) and perpendicular with respect to the traveling direction in moving body 200. First light emitters 110 are disposed more medially in moving body 200 than second light emitters 120 when seen along the traveling direction of moving body 200. To be specific, as illustrated in FIG. 2, first light emitters 110 are disposed closer to the negative side of the Y-axis than second light emitters 120 when looking at illumination device 100 from the positive side of the X-axis.

Note that in illumination device 100 on the negative side of the Y-axis out of the two illumination devices 100 included in moving body 200 shown in FIG. 1, first light emitters 110 are disposed closer to the positive side of the Y-axis than second light emitters 120 when looking at illumination device 100 from the positive side of the X-axis.

When illumination device 100 includes the plurality of second light emitters 120, the plurality of second light emitters 120 are arranged to curve vertically with proximity to an outside surface of moving body 200 when seen along the traveling direction. In the present embodiment, the plurality of second light emitters 120 are arranged to curve upward with proximity to the outside surface of moving body 200 when seen along the traveling direction.

First light emitter 110 includes main light source 111 and auxiliary light source 112. To be specific, first light emitter 110 includes at least one main light source 111, at least one auxiliary light source 112, first light guide 141, second light guide 142, optical component 150, base 161, substrate 170, and casing 180. In the present embodiment, as illustrated in FIG. 4, first light emitter 110 includes one main light source 111 and three auxiliary light sources 112.

Main light source 111 emits emission light (first emission light) L1 that is white light. Moreover, auxiliary light sources 112 emit emission light (second emission light) L2 that is white light. Main light source 111 and auxiliary light sources 112 include, for example, light-emitting diode (LED) chips that each emits blue light, and a fluorescent substance, such as yttrium aluminum garnet (YAG) that emits yellow fluorescent light excited by the blue light emitted from the LED chips. A wavelength of a part of the blue light emitted by the LED chips is changed into a yellow-light wavelength by the fluorescent substance. A portion of the blue light that is not absorbed by the fluorescent substance and the yellow light changed in wavelength by the fluorescent substance are mixed and emitted from main light source 111 and auxiliary light sources 112 as white light.

As illustrated in FIGS. 3 and 4, main light source 111 is disposed higher than auxiliary light sources 112 when seen along the traveling direction of moving body 200.

First light guide 141 guides emission light L1 transmitted from main light source 111 toward optical component 150 (first light emission direction). First light guide 141 is disposed closer to the positive side of the X-axis than main light source 111.

Second light guides 142 guide and transmit emission light L2 from auxiliary light sources 112 toward optical component 150 (second light emission direction). Second light guides 142 are each disposed closer to the positive side of the X-axis than auxiliary light sources 112.

The first light emission direction and the second light emission direction are the same directions.

First light guide 141, for example, turns emission light L1 emitted from main light source 111 into collimated light, i.e., collimates emission light L1, and transmits the collimated light toward optical component 150.

Second light guides 142, for example, turn emission light L2 emitted from auxiliary light sources 112 into collimated light, i.e., collimate emission light L2, and transmit the collimated light toward optical component 150.

Moreover, in the present embodiment, first light emitter 110 includes, for example, a plurality of auxiliary light sources 112. In such a case, second light guides 142, for example, at least partially surround first light guide 141 when looking along the traveling direction of moving body 200.

Note that, when seen along the traveling direction of moving body 200, second light guides 142 may completely surround first light guide 141, but may also, for example, surround only a lower side of first light guide 141. In the present embodiment, a configuration is shown in which the lower side of one first light guide 141 is surrounded by three second light guides 142 when seen along the traveling direction of moving body 200.

Illumination device 100, when seen along the traveling direction of moving body 200, may have a configuration in which first light guide 141 is surrounded by one second light guide 142, but may also have a configuration in which first light guide 141 is surrounded by the plurality of second light guides 142.

First light guide 141 and second light guides 142 are, for example, made of light-transmissive glass or acryl, or a transparent resin such as polycarbonate.

Optical component 150 controls a light distribution of emission light L1 and L2 from main light source 111 and auxiliary light sources 112, and is retained by casing 180. To be specific, optical component 150 guides emission light L1 and L2 transmitted from both first light guide 141 and second light guides 142 to the traveling direction of moving body 200. Optical component 150 is, for example, a lens. Optical component 150 is, for example, made of light-transmissive glass or acryl, or a transparent resin such as polycarbonate.

Base 161 is a base on which main light source 111, auxiliary light sources 112, casing 180, first light guide 141, second light guides 142, and the like are disposed. A material of base 161 is not particularly limited, but is, for example, a metal.

Substrate 170 is a substrate on which main light source 111 and auxiliary light sources 112 are mounted. A material of substrate 170 is not particularly limited, but is, for example, a metal substrate or a ceramic substrate.

Casing 180 houses main light source 111 and auxiliary light sources 112, and retains optical component 150 that transmits the white light emitted by main light source 111 and auxiliary light sources 112. A material of casing 180 is not particularly limited, but is, for example, a metal.

Second light emitter 120 includes at least main light source 121 out of main light source 111 and auxiliary light source 112. To be specific, second light emitter 120 includes at least one main light source 121, at least one auxiliary light source 122, first light guide 143, second light guide 144, optical component 150, base 161, substrate 170, and casing 180. In the present embodiment, as illustrated in FIG. 4, second light emitter 120 includes one main light source 121 and three auxiliary light sources 122, similar to first light emitter 110 shown in FIG. 4.

Main light source 121 emits emission light (first emission light) L3 that is white light. Moreover, auxiliary light sources 112 emit emission light (second emission light) L4 that is white light. Main light source 121 and auxiliary light sources 122 include, for example, LED chips that each emits blue light, and a fluorescent substance, such as YAG that emits yellow fluorescent light excited by the blue light emitted from the LED chips, similar to main light, source 111 and auxiliary light sources 112.

Main light source 121 is disposed higher than auxiliary light sources 112 when seen along the traveling direction of moving body 200.

First light guide 143 guides emission light L3 transmitted from main light source 121 toward optical component 151. First light guide 143 is disposed closer to the positive side of the X-axis than main light source 121.

Second light guides 144 guide and transmit emission light L4 from auxiliary light sources 122 toward optical component 151. Second light guides 144 are each disposed closer to the positive side of the X-axis than auxiliary light sources 122.

First light guide 143, for example, turns emission light L3 emitted from main light source 121 into collimated light, i.e., collimates emission light L3, and transmits the collimated light toward optical component 151.

Second light guides 144, for example, turn emission light L4 emitted from auxiliary light sources 122 into collimated light, i.e., collimate emission light L4, and transmit the collimated light toward optical component 151.

First light guide 143 and second light guides 144 are, for example, made of light-transmissive glass or acryl, or a transparent resin such as polycarbonate.

Optical component 151 controls a light distribution of emission light L3 and L4 from main light source 121 and auxiliary light sources 122, and is retained by a casing, similar to first light emitter 110. To be specific, optical component 151 guides emission light L3 and L4 transmitted from both first light guide 143 and second light guides 144 to the traveling direction of moving body 200. Optical component 151 is, for example, a lens. Optical component 151 is, for example, made of light-transmissive glass or acryl, or a transparent resin such as polycarbonate.

Base 162 is a base on which main light source 121, auxiliary light sources 122, first light guide 143, second light guides 144, and the like. A material of base 162 is not particularly limited, but is, for example, a metal.

Second light emitter 120 also includes a substrate on which main light source 111 and auxiliary light sources 112 are mounted, similar to first light emitter 110.

Processor 130 controls light output of main light sources 111 and 121, and auxiliary light sources 112, 122. Processor 130, for example, causes all main light sources 111 and 121 included in first light emitters 110 and second light emitters 120 to be turned on when causing high-beams to be emitted from illumination device 100, and causes at least main light source 121 in each second light emitter 120 to be turned on when causing low-beams to be emitted. Moreover, auxiliary light sources 112 and 122 are, for example, used as DRLs.

Processor 130 is, for example, a processor that is realized via software using (i) a central processing unit (CPU), and (ii) a control program stored on a storage device (not illustrated), such as read-only memory (ROM), random-access memory (RAM), a hard disk drive (HDD), or flash memory. Processor 130 may also be realized via software using a specialized electric circuit using, for example, a gate array.

Processor 130 switches between (i) a first mode in which main light source 111 and auxiliary light sources 112 are caused to emit light, main light source 111 with a greater light intensity than auxiliary light sources 112, and (ii) a second mode in which main light source 111 and auxiliary light sources 112 are caused to emit light, auxiliary light sources 112 with a greater light intensity than again light source 111.

For example in the second mode, processor 130 causes auxiliary light sources 112 included in first light emitter 110 and main light source 121 included in second light emitter 120 to emit light.

Moreover, illumination device 100 may, for example, include the plurality of light emitters having the main light source and auxiliary light sources as to be able to include first light emitters 110 and second light emitters 120. In this case, processor 130 further switches to a third mode in which main light source 121 (second main light source) included second light emitter 120, which is at least one of the plurality of light emitters, is caused to emit light with a greater light intensity than main light source 111 (first main light source) included in first light emitter 110, excluding second light emitter 120 among the plurality of light emitters.

It is not illustrated, but note that processor 130 is electrically coupled to main light source 111 and auxiliary light sources 112 using leads.

(Light Distribution Patterns of Illumination Device)

Light distribution patterns of the light radiated by illumination device 100 according to the embodiment will be described next with reference to FIGS. 7A to 7C.

Figure 7A:
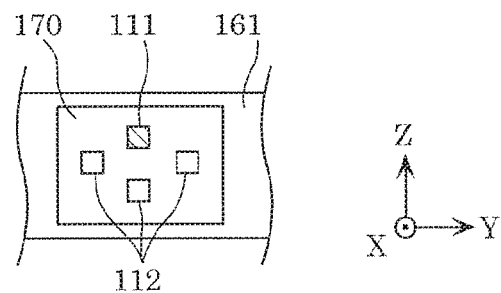
FIG. 7A is a diagram for describing an ON state of the main light source included in the illumination device according to the embodiment.

FIG. 7A is a diagram for describing an ON state of main light source 111 included in illumination device 100 according to the embodiment. FIG. 7B is a cross-sectional view for describing the ON state of main light source 111 included in illumination device 100 according to the embodiment. FIG. 7C is a diagram showing the light distribution pattern when main light sources 111 and 121 of the illumination device according to the embodiment are turned on.

Note that in FIG. 7A, in order to illustrate that only main light source 111 is turned on and the three auxiliary light sources 112 are turned off, main light source 111 is shown hatched and not with a cross section.

Figure 7B:
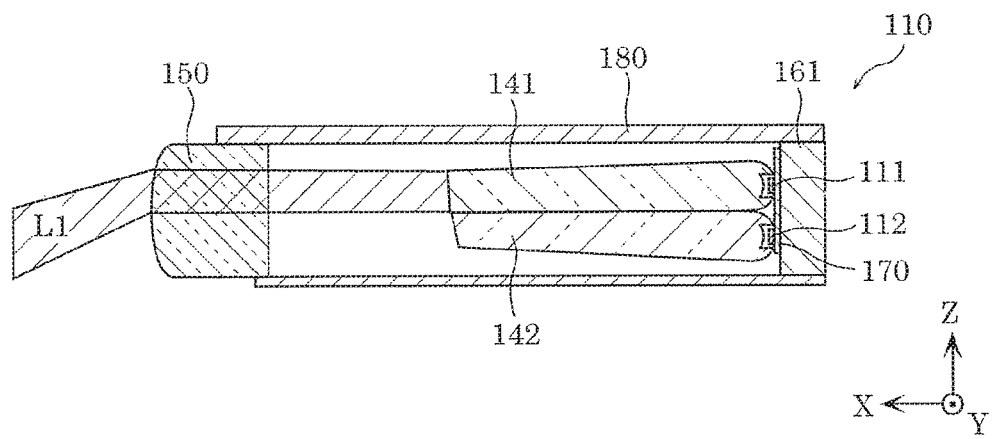
FIG. 7B is a cross-sectional view for describing the ON state of the main light source included in the illumination device according to the embodiment.
Figure 7C:
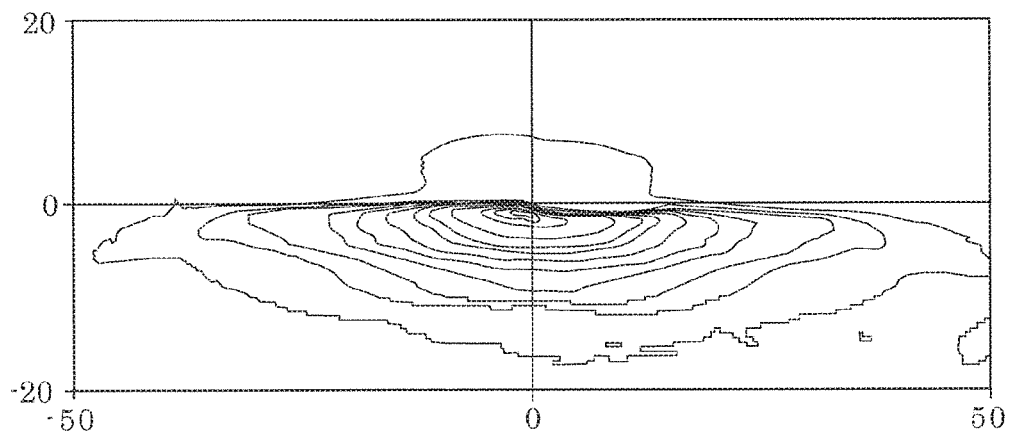

Moreover, FIG. 7B is a cross-sectional view corresponding to the cross-section along line III-III in FIG. 2. In FIGS. 7A and 7B, only one out of the plurality of first light emitters 110 is shown. FIG. 7C shows a light distribution pattern when the other first light emitters 110 and second light emitters 120 not illustrated in FIGS. 7A and 7B are also in the ON state (i.e., state in which each main light source thereof is turned on).

As illustrated in FIG. 7B, emission light L1 from main light source 111 is transmitted downward by optical component 150.

Figure 8A:
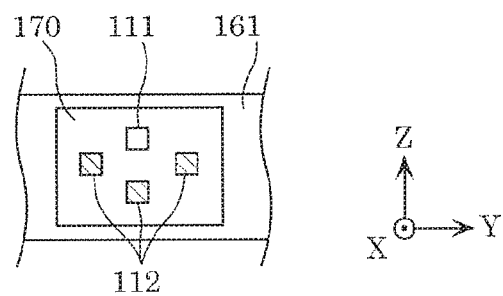
FIG. 8A is a diagram for describing an ON state of the auxiliary light sources included in the illumination device according to the embodiment.
Figure 8B:
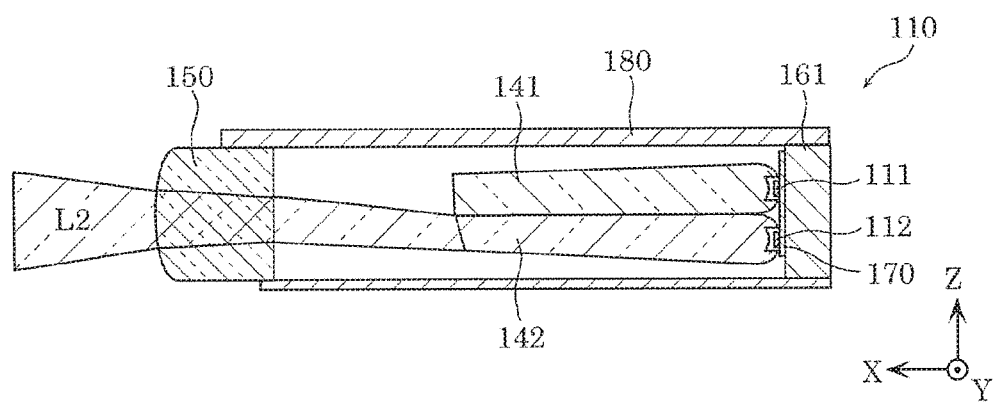
FIG. 8B is a cross-sectional view for describing the ON state of the auxiliary light sources included in the illumination device according to the embodiment.
Figure 8C:
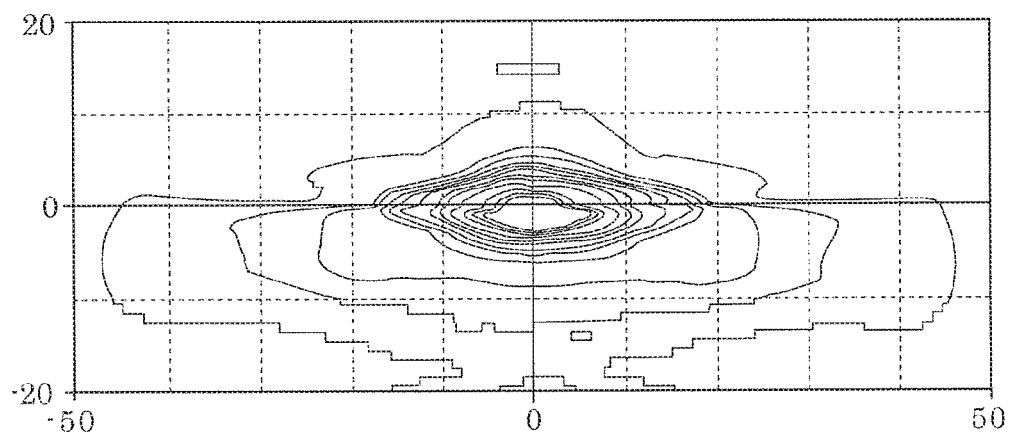

FIG. 8A is a diagram for describing an ON state of auxiliary light sources 112 included in illumination device 100 according to the embodiment. FIG. 8B is a cross-sectional view for describing the ON state of auxiliary light sources 112 included in illumination device 100 according to the embodiment. FIG. 8C is a diagram showing the light distribution pattern when auxiliary light sources 112 of the illumination device according to the embodiment are turned on.

Note that in FIG. 8A, in order to illustrate that three auxiliary light sources 112 are turned on and main light source 111 is turned off, auxiliary light sources 112 are shown hatched and not with a cross section.

Moreover, FIG. 8B is a cross-sectional view corresponding to the cross-section along line III-III in FIG. 2. In FIGS. 8A and 8B, only one out of the plurality of first light emitters 110 is shown. FIG. 8C shows a light distribution pattern when the other first light emitters 110 and second light emitters 120 not illustrated in FIGS. 8A and 8B are also in the ON state (i.e., state in which each auxiliary light source thereof is turned on).

As illustrated in FIG. 8B, emission light L2 from auxiliary light sources 112 is transmitted more horizontal than emission light L1 shown in FIG. 7B.

As described above, emission light L1 from main light source 111 is radiated more downward than emission light L2 from auxiliary light sources 112. To be specific, optical component 150 transmits emission light L1 transmitted from first light guide 141 to the traveling direction of moving body 200 more downward than emission light L2 transmitted from second light guides 142.

(Light Guides)

Configurations and light distribution patterns of the light guides will be described next with reference to FIG. 9A to 10B.

Figure 9A:
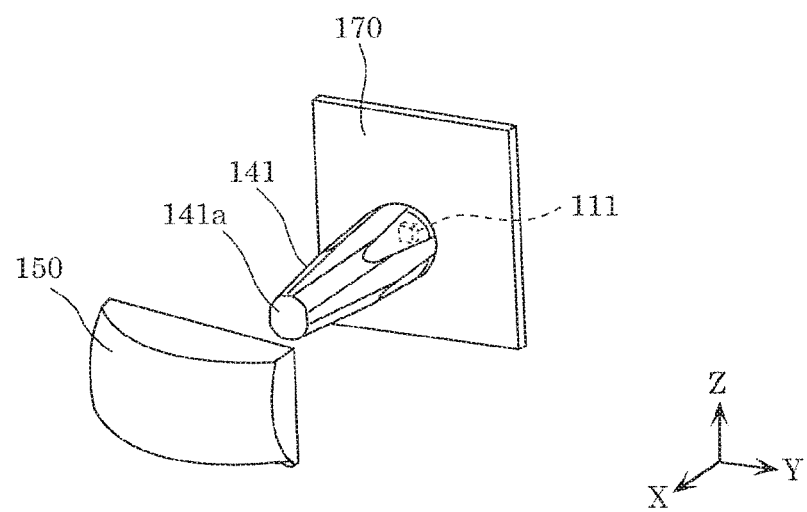
FIG. 9A is a perspective view showing the light guide included in the illumination device according to the embodiment.
Figure 9B:
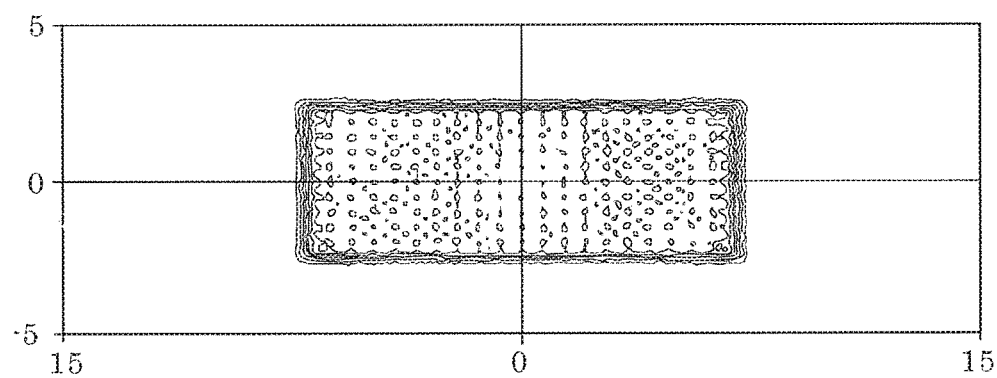
FIG. 9B is a diagram showing a light distribution pattern of the light guide and optical component included in the illumination device according to the embodiment.

FIG. 9A is a perspective view showing first light guide 141 included in illumination device 100 according to the embodiment. FIG. 9B is a diagram showing a light distribution pattern of first light guide 141 and optical component 150 included in illumination device 100 according to the embodiment.

As illustrated in FIG. 9A, first light guide 141 extends along the traveling direction of moving body 200 (i.e., the X-axis). Moreover, first light guide 141 includes emission surface 141a that emits emission light L1 from main light source 111. Emission surface 141a is rectangular with four rounded corners when seen along the traveling direction of moving body 200 (i.e., the X-axis). Emission surface 141a is, for example, circular.

Such a configuration makes it possible to, as illustrated in FIG. 9B, cause illumination device 100 to emit light, in which places where light is radiated and places where no light is radiated are demarcated, the light (i) maintaining a substantially equal light intensity even further away from a point that indicates a maximum light intensity (position of 0 along a horizontal axis and vertical axis shown in FIG. 9B), and (ii) rapidly attenuating in light intensity from a predetermined distance.

Figure 10A:
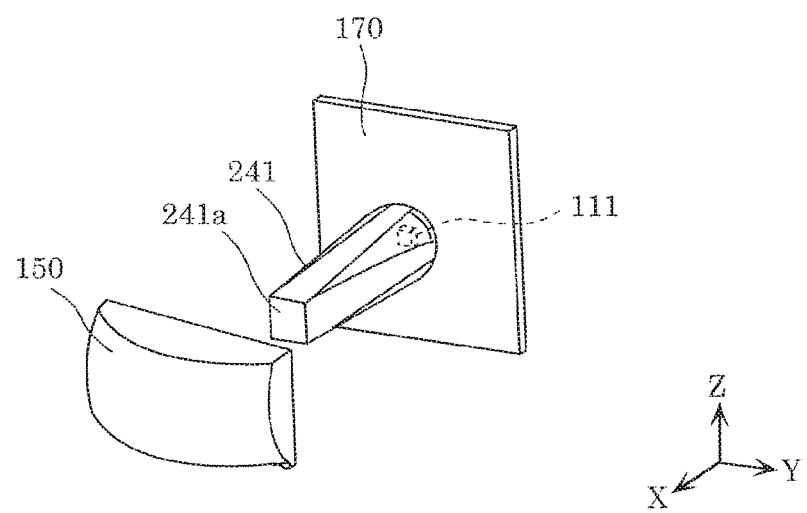
FIG. 10A is a perspective view showing a light guide included in a illumination device according to a comparative example.
Figure 10B:
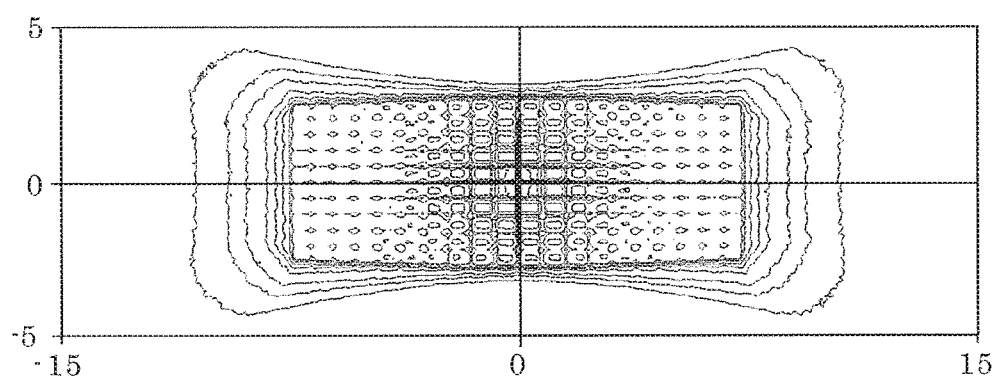
FIG. 10B is a diagram showing a light distribution pattern of the light guide and optical component included in the illumination device according to an aspect of the comparative example.

FIG. 10A is a perspective view showing light guide 241 included in a illumination device according to a comparative example. FIG. 10B is a diagram showing a light distribution pattern of light guide 241 and optical component 150 included in the illumination device according to an aspect of the comparative example.

Light guide 241 according to the comparative example only differs from first light guide 141 in that the shape of emission surface 241a is different. To be specific, emission surface 241a is rectangular when seen along the traveling direction of moving body 200 (i.e., the X-axis).

In such a configuration, as illustrated in FIG. 10B, the illumination device emits light in which the light intensity gradually decreases further away from a point that indicates a maximum light intensity (position of 0 along a horizontal axis and vertical axis shown in FIG. 10B) without clearly demarcating places where light is radiated and places where no light is radiated.

As described above, when looking at emission surface 141a along the traveling direction of moving body 200, the light can be caused to be radiated with a substantially uniform light intensity on desired places by emission surface 141a having a rectangular structure with rounded corners.

Note that FIGS. 9A and 9B show the structure of first light guide 141 for the sake of description. First light guide 143 and second light guides 142 and 144 may have the structure of first light guide 141 shown in FIGS. 9A and 9B.

(Advantageous Effects., etc.)

As described above, illumination device 100 according to the embodiment is disposed in moving body 200 and radiates light in the traveling direction of moving body 200. Illumination device 100 includes at least one main light source 111; at least one auxiliary light source 112 disposed in a periphery of main light source 111 when seen along the traveling direction of moving body 200; first light guide 141 that is disposed adjacent to the first light emission direction of main light source 111, and guides light transmitted from main light source 111; second light guide 142 that is disposed adjacent to the second light emission direction of auxiliary light source 112, and guides light transmitted from auxiliary light source 112; optical component 150 that transmits the light from first light guide 141 and second light guide 142 in the traveling direction of moving body 200; and processor 130 for switching between (i) the first mode in which main light source 111 is caused to emit light with a greater light intensity than auxiliary light source 112, and (ii) the second mode in which auxiliary light source 112 is caused to emit light with a greater light intensity than main light source 111.

With this, emission light L1 from main light source 111 and auxiliary light sources 112 from emission light L2 are guided and transmitted by optical component 150. Thus, for example, all light is transmitted by the same optical component 150 even when switching from DRL to high beams in the case of auxiliary light source 112 being used for DRL and main light source 111 for high beams. This makes it possible to, for example, limit a change in the emission position of the light in illumination device 100 even when switching from DRL to high beams. Illumination device 100 makes it possible, for example, to limit glare on the drivers of oncoming vehicles of moving body 200.

For example, first light guide 141 collimates and the light transmitted from main light source 111, and second light guides 142 collimate and transmit the light from auxiliary light sources 112.

This enables illumination device 100 to emit light for which the difference in light intensity is larger in places where light is radiated and places where no light is radiated.

Second light guides 142, for example, at least partially surround first light guide 141 when seen along the traveling direction of moving body 200.

Such a configuration makes it possible, for example, to cause illumination device 100 (more specifically, optical component 150) to emit, for example if the light intensity of emission light L1 is higher than that of emission light L2, light (i) with a narrower light distribution angle, i.e., light emitted from illumination device 100 radiated between a narrower range, and (ii) with a higher light intensity when switching from DRL to high beams in the case of auxiliary light source 112 being used for DRL and main light source 111 for high beams. With this, changes in the emission position of the light emitted by illumination device 100 are limited even when switching from DRL to high beams, i.e., even when the light distribution angle and light intensity of the light emitted by illumination device 100 is changed. Thus, glare is limited thanks to illumination device 100.

Illumination device 100 includes, for example, a plurality of main light sources. To be specific, illumination device 100 includes, for example, first light emitter 110 having main light source 111 and auxiliary light sources 112, and second light emitter 120 having at least main light source 121 out of main light source 121 and auxiliary light sources 122. In this case, processor 130 further switches to the third mode in which main light source 121 included in second light emitter 120 is caused to emit light with a greater light intensity than main light source 111 included in first light emitter 110.

With this, the occurrence of glare is limited in the third mode. The third mode is, for example, a mode in which low beams are emitted. In other words, illumination device 100 makes it possible to further limit the occurrence of glare when emitting low beams.

For example in the second mode, processor 130 causes auxiliary light sources 112 included in first light emitter 110 and main light source 121 included in second light emitter 120 to emit light.

Such a configuration makes it possible to emit light from any of first light emitter 110 and second light emitter 120 even when processor 130 has changed the mode in the case that illumination device 100 includes a plurality of light emitters. With this, changes in the emission position of the light emitted by mobile body illumination device 100 are limited. Thus, glare is further limited thanks to illumination device 100.

First light emitter 110 and second light emitter 120 are, for example, arranged horizontally and perpendicular with respect to the traveling direction in moving body 200, and first light emitter 110 is disposed more medially in moving body 200 than second light emitter 120 when seen along the traveling direction of moving body 200.

Such a configuration makes it possible to, for example, limit light in places where drivers of oncoming vehicles of moving body 200 do not expect it due to a plurality of light emitters being disposed even when processor 130 has switched modes. This enables illumination device 100 to further limit glare.

Illumination device 100 includes, for example, a plurality of second light emitters 120. In this case, the plurality of second light emitters 120, the plurality of second light emitters 120 are arranged to curve vertically with proximity to the outside surface of moving body 200 when seen along the traveling direction of moving body 200.

Such a configuration makes it possible to easily attract the attention of drivers due to places in which the plurality of second light emitter 120 are disposed are curved when looking at illumination device 100 from the drivers of oncoming vehicles. Thus, to the drivers, the risk of places they are not aware of unexpectedly shining light is reduced in moving body 200. This enables illumination device 100 to further limit glare.

To be specific, optical component 150 transmits emission light L1 from first light guide 141 to the traveling direction of moving body 200 more downward than emission light L2 transmitted from second light guides 142.

This makes it possible to further distance emission light L1 emitted by main light source 111 from the field of vision center of drivers of oncoming vehicles. Since main light source 111 is, for example, used as high beams, main light source 111 emits light with a greater light intensity than auxiliary light sources 112 used as, for example, DRLs. Thus, emission light L1 from main light source 111 easily causes glare. Accordingly, by further distancing emission light L1 emitted by main light source 111 from the field of vision center of drivers of oncoming vehicles, the occurrence of glare can further be limited.

Moving body 200 includes illumination devices 100 as headlamps.

This makes it possible to realize moving body 200 that does not cause glare easily.

Variation

A variation of the light guide included in illumination device 100 will be described next with reference to FIGS. 11 and 12.

Figure 11:
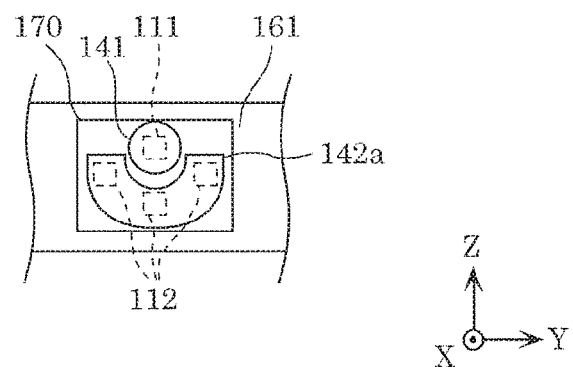
FIG. 11 is a diagram for describing a positional relationship between a variation of the light guide, the main light source, and the auxiliary light sources.

FIG. 11 is a diagram for describing a positional relationship between second light guide 142a, main light source 111, and auxiliary light sources 112. FIG. 12 is a diagram for describing a shape of second light guide 142a. To be specific, (a) of FIG. 12 is a front elevation of second light guide 142a when looking thereat along the traveling direction of moving body 200. Moreover, (b) of FIG. 12 is a bottom view of second light guide 142a when looking thereat from below.

First light guide 141 is shaped, for example, like a rod and extends along the traveling direction of moving body 200, as illustrated in FIG. 3.

Moreover, second light guide 142a is gutter-shaped when seen along the traveling direction of moving body 200. In other words, second light guide 142a is concave when seen along the traveling direction of moving body 200. In this manner, second light guide 142a is concave and surrounds first light guide 141 when seen along the traveling direction of moving body 200. In other words, in FIG. 3, the configuration wherein, for example, the lower side of one first light guide 141 is surrounded by three second light guides 142 is shown, but in the variation, first light guide 141 is surrounded by one second light guide 142a. As illustrated in FIG. 11, second light guide 142a has, for example, a recess curved downward when seen along the traveling direction of moving body 200. First light guide 141 is disposed in the recess. Second light guide 142a surrounds, for example, the lower side and other sides of first light guide 141 when seen along the traveling direction of moving body 200.

Such a configuration also makes it possible, for example, to cause illumination device 100 (more specifically, optical component 150) to emit, for example if the light intensity of emission light L1 is higher than that of emission light L2, light (i) with a narrower light distribution angle, i.e., light emitted from illumination device 100 radiated between a narrower range, and (ii) with a higher light intensity when switching from DRL to high beams in the case of auxiliary light source 112 being used for DRL and main light source 111 for high beams. With this, changes in the omission position of the light emitted by illumination device 100 are limited even when switching from DRL to high beams, i.e., even when the light distribution angle and light intensity of the light emitted by illumination device 100 is changed. Thus, glare is limited thanks to illumination device 100.

Moreover, illumination device 100 includes, for example, the plurality of auxiliary light sources 112 surrounding main light source 111, as illustrated in FIG. 11, when seen along the traveling direction of moving body 200. In this case, second light guide 142a may also include a plurality of protrusions 142b that protrude to a corresponding one of the plurality of auxiliary light sources 112.

Such a configuration enables the light from the plurality of auxiliary light sources 112 to be more easily incident on second light guide 142a thanks to protrusions 142b. In other words, such a configuration enhances light coupling efficiency between second light guide 142a and auxiliary light sources 112.

Figure 12:
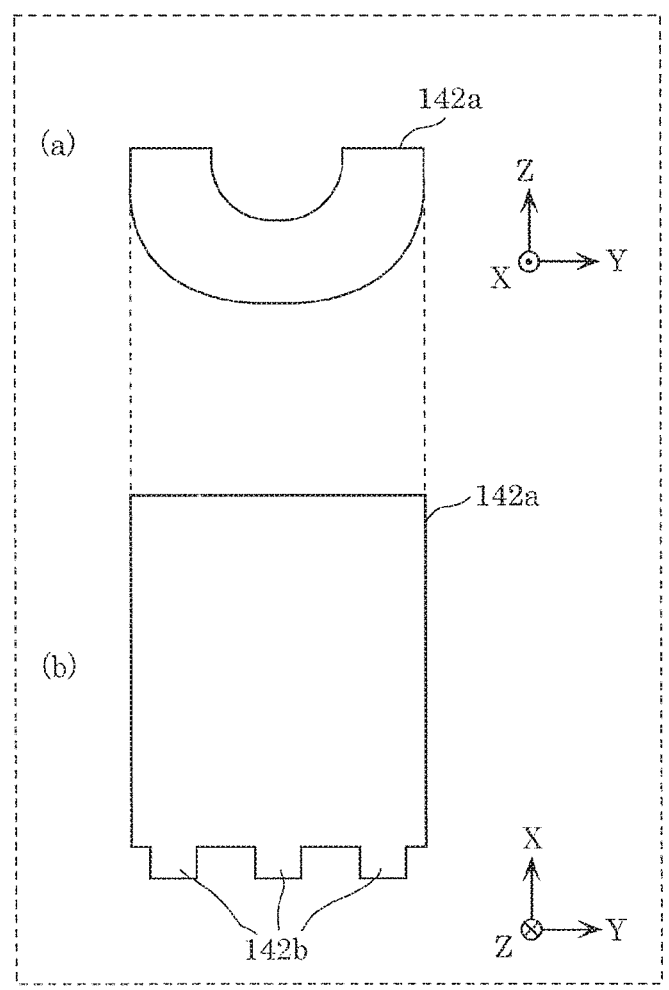
FIG. 12 is a diagram for describing a shape of the variation of the light guide.

Note that FIGS. 11 and 12 show second light guide 142a disposed close to the traveling direction of moving body 200 in main light source 111 and auxiliary light sources 112 included in first light emitter 110, but the structure of second light guide 142a may also be used for second light guide 144 included in second light emitter 120.

Other Embodiments

The illumination device and moving body according to the embodiment and variation have been described above, but the present disclosure is not limited to the foregoing.

In the above embodiment, main light sources 111 and 121, and auxiliary light sources 112 and 122 have been described as including, for example, one LED chip (light-emitting element), but the structure of main light sources 111 and 121, and auxiliary light sources 112 and 122 is not limited thereto as long as they can emit white light.

In the above embodiment, an LED chip has been used as a concrete example of a light-emitting element, but a semiconductor light-emitting device such as a semiconductor laser, a solid-state light-emitting device such as an organic electroluminescent (EL) device or inorganic EL device may also be used for the light-emitting element. Main light sources 111 and 121, and auxiliary light sources 112 and 122 may also include at least two types of fluorescent substances in which the main fluorescence wavelengths are different from each other. In either case, as long as the configurational conditions of the above-described illumination device 100 are fulfilled, illumination device 100 can, for example, limit glare on the drivers of oncoming vehicles.

Main light sources 111 and 121, and auxiliary light sources 112 and 122 may be LED modules with a surface mount device (SMD) structure, or may also be so-called LED modules with a chip-on-board (COB) structure in which the LED chips are directly mounted on a substrate.

Main light sources 111 and 121, and auxiliary light sources 112 and 122 in the present disclosure may also be remote phosphor light-emitting modules in which a resin including a fluorescent substance is disposed separated from the LED chips.

Additionally, forms obtained by various modifications to the embodiments that can be conceived by a person skilled in the art as well as forms realized by optionally combining components and functions in the embodiments which are within the scope of the essence of the present disclosure are included in the present disclosure.

What is claimed is:

1. An illumination device disposed on a moving body that radiates light in a traveling direction of the moving body, the illumination device comprising:
   at least one main light source;
   at least one auxiliary light source disposed in a periphery of the at least one main light source when seen along the traveling direction;
   a first light guide that is disposed adjacent to the at least one main light source, and guides light transmitted from the at least one main light source in a first light emission direction;
   a second light guide that is disposed adjacent to the at least one auxiliary light source, and guides light transmitted from the at least one auxiliary light source in a second light emission direction;
   an optical component that transmits the light from the first light guide and the light from the second light guide along the traveling direction of the moving body; and
   a processor configured to switch between (i) a first mode in which the at least one main light source is caused to emit light with a greater light intensity than the at least one auxiliary light source, and (ii) a second mode in which the at least one auxiliary light source is caused to emit light with a greater light intensity than the at least one main light source.

2. The illumination device according to claim 1, wherein
   the first light guide collimates the light transmitted from the at least one main light source, and
   the second light guide collimates the light transmitted from the at least one auxiliary light source.

3. The illumination device according to claim 1, wherein the second light guide at least partially surrounds the first light guide when seen along the traveling direction.

4. The illumination device according to claim 3, wherein the first light guide is shaped like a rod and extends along the traveling direction, and
   the second light guide extends along the traveling direction, has a concave shape, and surrounds the first light guide when seen along the traveling direction.

5. The illumination device according to claim 3, further comprising:
   a plurality of auxiliary light sources that surround the at least one main light source when seen along the traveling direction, each of the plurality of auxiliary light sources being the at least one auxiliary light source, wherein
   the second light guide has a plurality of protrusions each of which protrudes toward a corresponding one of the plurality of auxiliary light sources.

6. The illumination device according claim 1, further comprising:
   a plurality of main light sources each being the at least one main light source;
   a first light emitter including the at least one main light source and the at least one auxiliary light source; and
   a second light emitter including at least the at least one main light source, wherein
   the processor is further configured to
   switch to a third mode in which the at least one main light source included in the second light emitter is caused to emit light with a greater light intensity than the at least one main light source included in the first light emitter.

7. The illumination device according to claim 6, wherein in the second mode, the processor is configured to
   cause the at least one auxiliary light source included in the first light emitter and the at least one main light source included in the second light emitter to emit light.

8. The illumination device according to claim 6, wherein the first light emitter and the second light emitter are arranged horizontally and perpendicular with respect to the traveling direction, and
   the first light emitter is disposed more medially in the moving body than the second light emitter when seen along the traveling direction.

9. The illumination device according to claim 8, further comprising:
   a plurality of second light emitters each being the second light emitter, wherein
   the plurality of second light emitters are arranged to curve vertically with proximity to an outside surface of the moving body when seen along the traveling direction.

10. The illumination device according to claim 1, wherein the optical component transmits first emission light from the first light guide more downward than second emission light from the second light guide in the traveling direction of the moving body.

11. The illumination device according to claim 1, wherein in the first light guide, an emission surface through which the light from the at least one main light source is emitted is circular when seen along the traveling direction, and
    in the second light guide, an emission surface through which the light from the at least one auxiliary light source is emitted is circular when seen along the traveling direction.

12. A moving body, comprising:
    the illumination device according to claim 1 as a head-lamp.

* * * * *